(12) United States Patent
Jalilevand et al.

(10) Patent No.: US 10,076,944 B2
(45) Date of Patent: Sep. 18, 2018

(54) VEHICLE CABIN AIR CONDITIONING AND BATTERY COOLING SYSTEM

(71) Applicant: Ford Global Technologies, LLC, Dearborn, MI (US)

(72) Inventors: Ali Jalilevand, Ann Arbor, MI (US); Manfred Koberstein, Troy, MI (US); Michael Steven Wallis, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 15/190,333

(22) Filed: Jun. 23, 2016

(65) Prior Publication Data

US 2017/0217279 A1    Aug. 3, 2017

Related U.S. Application Data

(60) Provisional application No. 62/288,721, filed on Jan. 29, 2016.

(51) Int. Cl.
*F25D 15/00* (2006.01)
*B60H 1/00* (2006.01)
*B60H 1/32* (2006.01)

(52) U.S. Cl.
CPC ..... *B60H 1/00278* (2013.01); *B60H 1/00328* (2013.01); *B60H 1/00885* (2013.01); *B60H 1/3202* (2013.01)

(58) Field of Classification Search
CPC .... F28D 15/0266; F25B 23/006; F25B 13/00; B60H 1/00278; B60H 1/00328; B60H 1/3202
USPC ............................. 62/119, 238.6, 238.7, 244
See application file for complete search history.

(56) References Cited

U.S. PATENT DOCUMENTS

| 7,971,447 B2 | 7/2011 | Maitre |
| 8,215,432 B2 | 7/2012 | Nemesh et al. |
| 8,448,460 B2 | 5/2013 | Dogariu et al. |
| 2010/0251742 A1* | 10/2010 | Tucker .................. F24F 1/0059 62/324.6 |
| 2012/0085114 A1* | 4/2012 | Graaf ................. B60H 1/00278 62/238.7 |
| 2012/0085512 A1 | 4/2012 | Graaf et al. |
| 2012/0118005 A1* | 5/2012 | Yamashita ................ F24F 3/06 62/513 |
| 2014/0202178 A1 | 7/2014 | Trumbower |

* cited by examiner

*Primary Examiner* — Melvin Jones
(74) *Attorney, Agent, or Firm* — Vichit Chea; Brooks Kushman P.C.

(57) ABSTRACT

A vehicle includes a cooling arrangement that includes an air conditioning loop and a battery cooling loop connected together by a common chiller and arranged to cool each of cabin air and a battery. A coolant three-way proportional control valve is connected to the chiller and the battery. The control valve is configured to operatively control a capacity of the chiller for the battery.

20 Claims, 2 Drawing Sheets

VEHICLE CABIN AIR CONDITIONING AND BATTERY COOLING SYSTEM

TECHNICAL FIELD

The present disclosure relates generally to controlling cooling systems for batteries that are integrated with a vehicle cabin air conditioning system.

BACKGROUND

Automotive vehicles have begun employing electric motors to supplement propulsion provided by a main motor, such as an internal combustion engine. These motors utilize high performance batteries to store energy needed for the propulsion, as well as to power accessories. One potential concern is that high performance batteries generate a large amount of heat. Accordingly, it is desirable to removed and/or reduce the heat generated by the battery for the performance of the battery, as well as to prevent overheating.

In some known battery systems, air flow from the vehicle cabin air conditioning refrigerant system is utilized to cool such batteries. Such battery cooling systems, either standalone configurations or ones that are integrated with a vehicle cabin air conditioning refrigerant system, utilizes a chiller. Heat from the battery is rejected into the chiller using a cooling loop that is integrated with a refrigeration system via the chiller. However, these systems have disadvantages. For example, chiller capacity can reduce or degrade cabin cooling. Further, when the chiller initially comes on, cabin temperature can jump, resulting in discomfort. While cabin air temperature can be maintained at a desirable condition, the chiller cooling rate must be slowed down, thereby adversely impacting the batteries.

SUMMARY

A vehicle includes a cooling arrangement that includes an air conditioning loop and a battery cooling loop connected together by a common chiller and arranged to cool each of cabin air and a battery. A coolant three-way proportional control valve is connected to the chiller and the battery. The control valve is configured to operatively control a capacity of the chiller for the battery.

In one exemplary arrangement, the vehicle cooling arrangement may further includes a thermal expansion valve and at least one evaporator for controlling introduction of refrigerant within the air conditioning loop into the chiller.

In another exemplary arrangement, the vehicle cooling arrangement may further comprise a due valve that operatively connects the battery and a radiator.

In another exemplary arrangement, the vehicle cooling arrangement may further comprise a by-pass line operatively connected to the proportional valve, wherein an outlet of the by-pass line is connected to a coolant pump.

A method of cooling a vehicle battery is also disclosed. In one exemplary arrangement, the method comprises selectively directing coolant flow to a proportional control valve, operating the proportional control valve to selectively direct at least a portion of coolant into a chiller, and adjusting a flow rate of the coolant into the chiller in response to battery temperature exceeding a predetermined battery threshold temperature.

BRIEF DESCRIPTION OF THE DRAWINGS

The present disclosure is described below, with reference to the drawings listed below. In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure relates to an arrangement for a vehicle cabin air conditioning and battery cooling system 10 that has a valve that is operatively configured to open and close to allow variable a coolant flow rate to a chiller, or even bypass the chiller. The disclosed arrangement controls the chiller capacity and amount of cooling needed for the vehicle batteries by controlling a duty cycle (i.e., open/close rate) of a 3-way coolant valve. Further, the disclosed arrangement allows for the ability to maintain the cabin air temperature at a desirable condition by slowing down a chiller cooling rate. As compared to standalone battery cooling systems that are separate from a vehicle cabin air conditioning system, the arrangement disclosed herein further includes the ability to eliminate a compressor, a condenser and refrigerant lines associated with separate battery cooling. By eliminating these components, weight of a vehicle can be reduced, and improved packaging arrangements can be achieved, resulting in lower costs.

Figure 1:
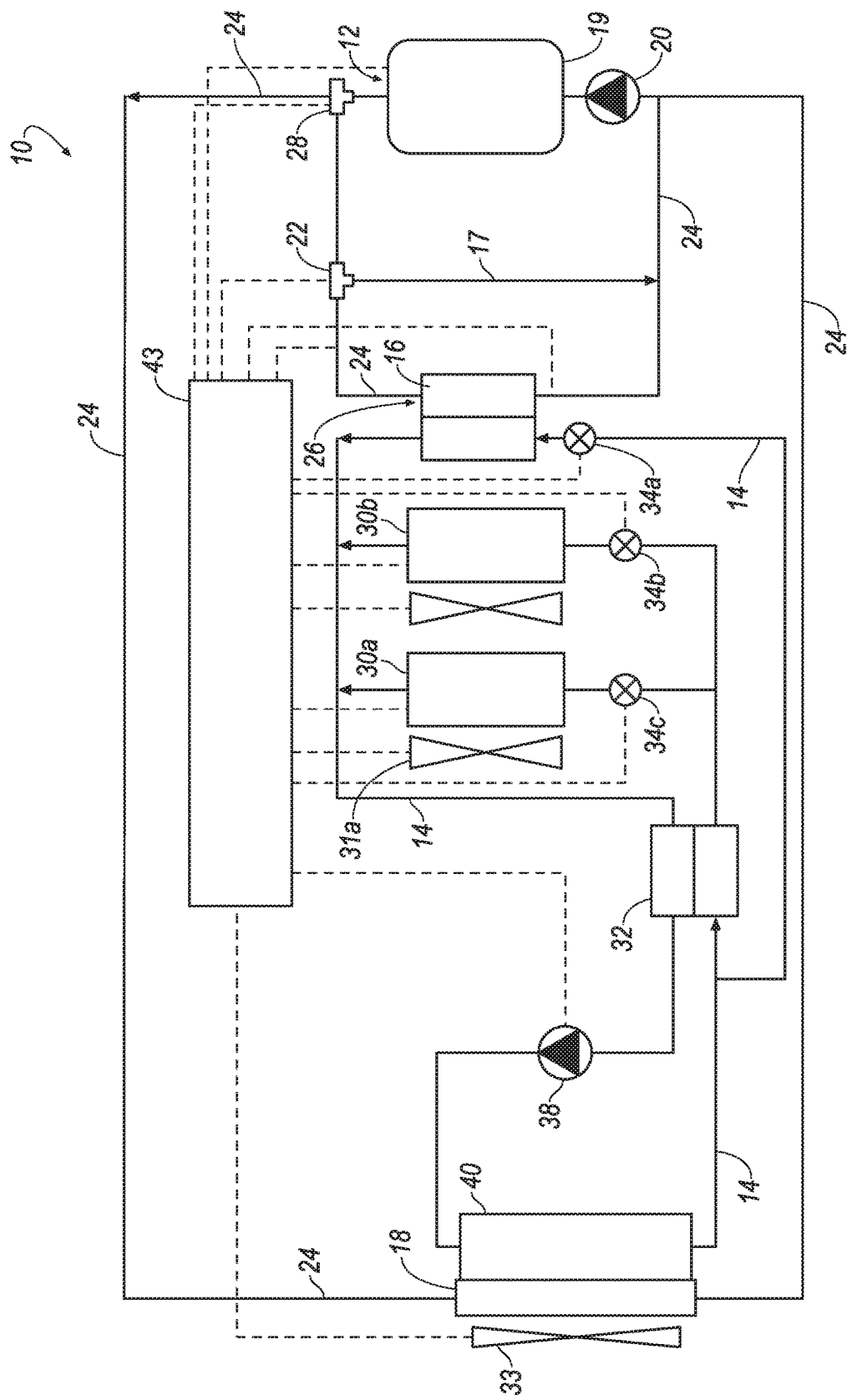
FIG. 1 is a schematic diagram illustrating an exemplary arrangement of a vehicle cabin air conditioning and battery cooling system.

An exemplary arrangement of a vehicle cabin conditioning and battery cooling system 10 is show in FIG. 1. In this arrangement, the cooling system 10 includes a battery cooling loop 12 and an air conditioning loop 14. The battery cooling loop 12 includes a battery 19, which typically includes multiple cells. The battery 19 may be cooled by using battery cooling loop 12. The battery 19 may be operatively connected to a vehicle's electrical power delivery network, and provide and store electrical energy as needed. The cooling system 10 further includes a chiller 16, a radiator 18, such as a low temperature radiator, and a pump 20. A 3-way coolant valve 22 is connected via coolant lines 24 to an outlet of the battery 19 and an inlet 26 of the chiller 16. Battery coolant is directed through the coolant lines 24. In the exemplary arrangement, to achieve a desired cooling performance of the battery 19, the 3-way coolant valve 22 is a proportional valve, the operation of which will be explained in further detail below. The total flow of battery coolant is directed from the battery 19 into the 3-way coolant valve 22, from which total flow may be directed into the chiller 16, a bypass line 17 to direct flow of coolant to a second duo valve 28, which is operably connected to the battery radiator 18, the chiller 16 or a combination of both. The duo valve 28 is an on/off valve. However, the operational state of the duo valve 28 will depend on ambient conditions, as will be explained in further detail.

The coolant valve 22 operates with a control unit 43 to provide a specified variable coolant flow rate to direct the coolant flow to the chiller 16 at a predetermined rate to control the chiller 16 capacity that may be impacted by the air conditioning loop 14 or the battery loop 12. To slow down chiller 16 capacity, the coolant valve 22 may direct the coolant flow to the radiator 18 (via bypass line 17), so that heat may be removed from the coolant by passing a flow of ambient air therethrough. Alternatively, the duo valve 28 may bypass the radiator 18.

The air conditioning loop 14 is integrated with the battery cooling loop 12 via the chiller 16. In addition to the chiller 16, the air conditioning loop 14 also comprises at least one evaporator 30. In the arrangement shown in FIG. 1 there is a forward evaporator 30A, as well as a rear evaporator 30B. A forward blower 31A and a rearward blower 31B may be operably connected with the forward and rear evaporators 30A and 30B, respectively. Air conditioning loop 14 further comprises a heat exchanger 32 (referred to as "IHX"), thermal expansion valves 34a, 34b, 34c (referred to as "TXV"), a compressor 38 and a condenser 40 that is connected to the radiator 18. An engine/powertrain fan 33 may be operatively connected to the radiator 18. Refrigerant is directed through refrigerant lines of the air conditioning loop 14. In operation, the refrigerant is cycled through the air conditioning loop 14, which absorbs heat from the vehicle cabin and rejects the heat to the ambient air.

The compressor 38 takes in low pressure, low temperature refrigerant that is in a vapor state and is coming out of the evaporators 30a, 30b and the chiller 16. The low pressure, low temperature vapor refrigerant is a superheated gas. The compressor 38 then compresses the refrigerant into a high pressure, high temperature vapor which is then sent to a condenser 40. The high pressure, high temperature vapor refrigerant is then passed through the condenser 40, where a condenser fan (or powertrain cooling fan) 33 blows ambient air across thru the condenser 40 and heat is transferred from the high pressure, high temperature vapor refrigerant to the ambient air blowing across the condenser 40. The refrigerant exiting the condenser 40 is a high pressure, high temperature liquid that then enters a receiver-drier (not shown). The receiver-drier serves as a filter that removes any moisture and some contaminants that get into the air conditioning loop 14. The receiver-drier contains a desiccant that removes moisture from the refrigerant. In the arrangement shown in FIG. 1, the condenser 40 and the receiver-drier may be combined into a single unit.

After leaving the receiver-drier, the refrigerant still in the high pressure, high temperature liquid state, then enters the thermal expansion valves (TXV) 34a, 34b, 34c. The TXV 34a controls the amount of refrigerant entering the chiller 16. The TXV 34a may be selectively opened to allow liquid refrigerant to flow into the chiller 16 as needed to provide a temperature gradient across the chiller 16 from refrigerant side to the coolant side. The 3-way coolant valve 22 allows specified/adequate coolant flow into the chiller 16 via battery cooling loop 12 to manage required capacity output from the chiller 16.

The TXV 34b controls the amount of refrigerant entering the rear evaporator 30b. If the temperature of the refrigerant leaving the rear evaporator 30b is too hot, the TXV 34b opens, allowing more liquid refrigerant to flow into the rear evaporator 30b. If the temperature of the refrigerant leaving the rear evaporator 30b is too cold, the TXV 34b closes, reducing the amount of refrigerant flowing into the rear evaporator 30b.

The TXV 34c controls the amount of refrigerant entering the front evaporator 30a. If the temperature of the refrigerant leaving the front evaporator 30a is too hot, the TXV 34c opens, allowing more liquid refrigerant to flow into the front evaporator 30a. If the temperature of the refrigerant leaving the front evaporator 30a is too cold, the TXV 34c closes, reducing the amount of refrigerant flowing into the front evaporator 30a.

The refrigerant then leaves the TXV 34a, 34b, 34c in a low pressure, low temperature liquid and vapor mixture and enters the evaporators 30a, 30b and/or chiller 16, and heat is transferred from the air and into the refrigerant. The cooled air is then introduced into the vehicle cabin. The refrigerant leaving the evaporators 30a, 30b and chiller 16 is a low pressure, low temperature vapor that then flows through the heat exchanger 32, and then again to the compressor 38, where the cycle then repeats itself.

Figure 2:
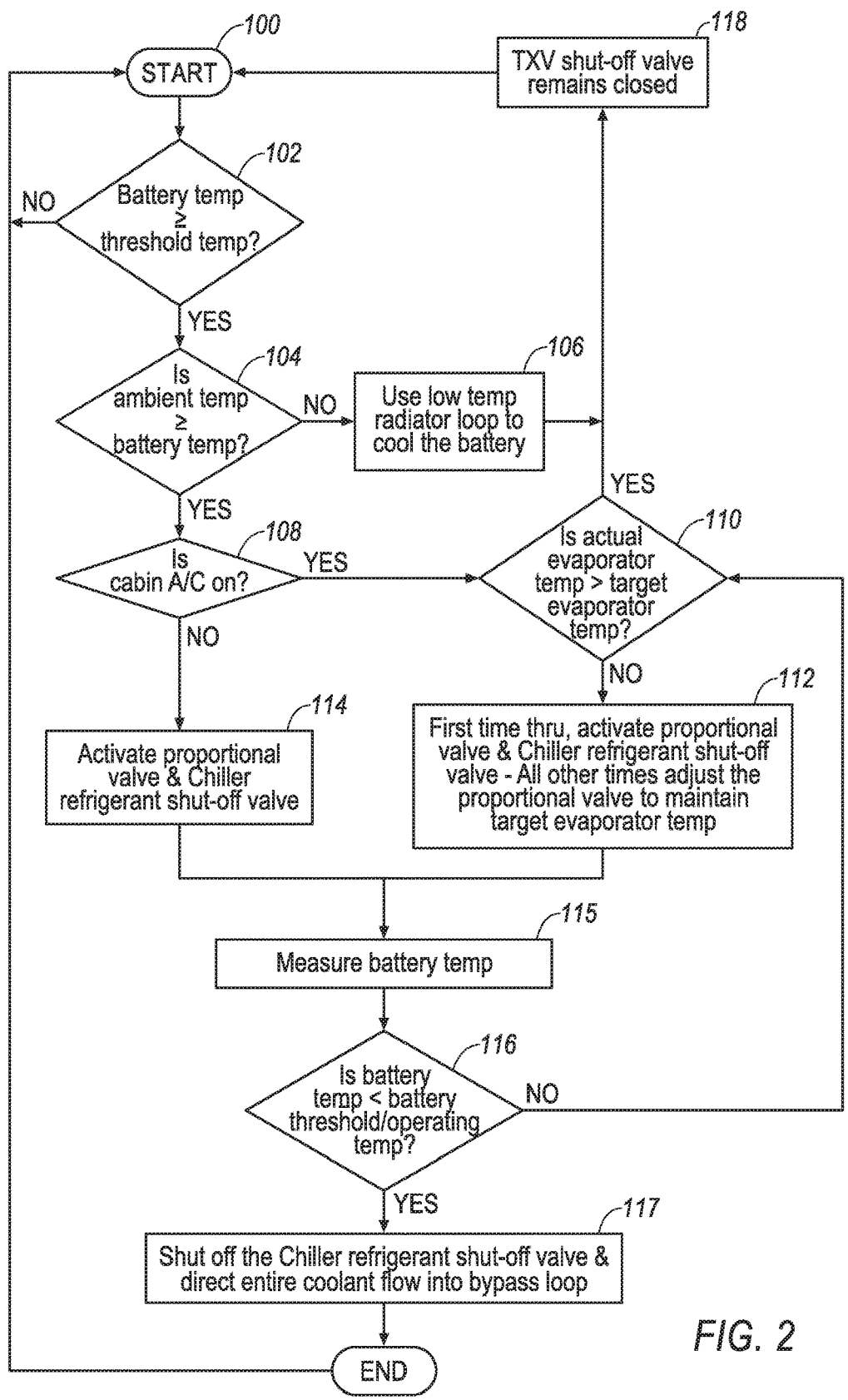
FIG. 2 is a flow chart illustrating operation of the exemplary arrangement of the vehicle cabin air conditioning and battery cooling system of FIG. 1.

Referring to FIG. 2, operation of vehicle cabin air conditioning and battery cooling system 10 will be explained in further detail in connection with process flow 100. Process flow 100 begins with an initial step 102 of measuring the temperature of the battery 15. If the battery temperature is at or below a threshold limit, the process stops. If the battery temperature exceeds the threshold limit, the process then proceeds to step 104, whereby the ambient temperature is measured and compared to the battery temperature.

In the winter months in many climates (or in cold climates), there is enough cold ambient air available to cool the battery 19. Thus, if the ambient temperature less than the battery temperature, the process moves to step 106, whereby the coolant flow is directed via valve 28 through the radiator 18.

However, during the summer months, or in warm climates, the ambient air will not serve to adequately cool the battery 15. Accordingly, if the ambient temperature is greater than (or equal to) the battery temperature, the process moves to step 108. In step 108, it is determined whether if the vehicle cabin air conditioning is turned on. If the determination is "yes," (i.e., if the cabin air condition is turned on), then the process moves to step 110. If the cabin air conditioning is not on, operation moves to 114 to allow refrigerant and coolant heat transfer in chiller 16. More specifically, coolant is directed to through valve 28 to 3-way coolant valve 22 to direct flow into the chiller 16.

In step 110 actual evaporator temperature is compared with a target evaporator temperature. If actual evaporator temperature is greater than the target evaporator temperature then the chiller 16 refrigerant valve 34a will shut-off to provide maximum cooling priority to cabin. If actual evaporator temperature is less than target evaporator temperature, operation moves to step 112. During an initial start up mode (i.e., after the vehicle is turned on or powered up after being powered down), the valve 28 is actuated to direct coolant to coolant valve 22 to direct flow into the chiller 16. For subsequent operation of step 112, the control unit 43 will operate to selective adjust the proportional valve to maintain the target evaporator temperature.

Further, in step 112, valve 22 is adjusted to allow the rate of coolant flow into the chiller 16 to be selectively adjusted to achieve a desired chiller 16 capacity. Thus, to control the rate of coolant flow, part of the coolant flow may be directed through the bypass line 17. Once directed through the bypass line 17, the bypassed coolant flow will merge back into the main flow path, and the total coolant flow will be directed back to coolant pump 20.

After steps 112 or 114 are performed, the process moves to step 115, whereby battery temperature is measured. Next, in step 116, it is determined whether the measured battery temperature is less than a battery temperature threshold/operating temperature. If the determination is "no," the operation will return to process 110 to allow thermal load exchange between coolant and refrigerant. If the determination of step 110 is "yes" (i.e., the actual evaporator temperature is greater than a target evaporator temperature), the refrigerant flow into the chiller will stop and the process will move to step 118 to stop exchange of thermal load between the refrigerant and coolant in chiller 16 (because the TXV 34*a* is shut off)

Finally, the valve 22 may also be adjusted to provide vehicle cabin temperature ramp up and eliminate cabin temperature spike when there is a chiller demand in step 110.

Step 117 provides that if the battery temperature is less than or lower than the threshold battery temperature/operating temperature, the valve 22 may be shut off and the entire coolant flow may be directed into the bypass line 17. In addition, the present disclosure provides that selective adjustment of the valve 22 may be achieved by the control unit 43 such that excess coolant (i.e., only a portion of the total coolant flow) may be diverted through the bypass line 17 and the bypassed coolant flow merges back into the main flow path such that the total coolant flow will be directed back to the coolant pump 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a cooling arrangement including an air conditioning loop and a battery cooling loop connected together by a chiller and arranged to cool each of cabin air and a battery;
a coolant three-way proportional control valve connected to the chiller and the battery, wherein the control valve is configured to operatively control a capacity of the chiller for the battery; and
a by-pass line operatively connected to the proportional control valve, wherein an outlet of the by-pass line is connected to a coolant pump.

2. The vehicle of claim 1 further comprising a thermal expansion valve for controlling introduction of refrigerant from the air conditioning loop into the chiller.

3. The vehicle of claim 1, wherein the battery cooling loop further comprises a pump.

4. The vehicle of claim 1, wherein the air conditioning loop further comprises at least one evaporator and at least one thermal expansion valve for controlling introduction of refrigerant within the air conditioning loop into the chiller.

5. The vehicle of claim 4, wherein the at least one evaporator comprises front and rear evaporators.

6. The vehicle of claim 1, wherein the air conditioning loop further comprises a compressor.

7. The vehicle of claim 1, further comprising a duo valve that operatively connects the battery and a radiator.

8. The vehicle of claim 1, wherein the chiller includes an outlet on the battery cooling loop that is connected to the coolant pump.

9. The vehicle of claim 1, further comprising a radiator operatively connected to the battery cooling loop.

10. A method of cooling a vehicle battery, comprising:
selectively directing coolant flow to a proportional control valve;
operating the proportional control valve to selectively direct at least a portion of coolant into a chiller; and
adjusting a flow rate of the coolant into the chiller in response to battery temperature exceeding a predetermined battery threshold temperature.

11. The method of claim 10, wherein the proportional control valve adjusts the flow rate as a function of an evaporator temperature in an air conditioning loop of the vehicle.

12. The method of claim 11, wherein the flow rate is adjusted if an actual evaporator temperature is greater than a predetermined threshold evaporator temperature to increase cooling to a vehicle cabin.

13. The method of claim 12, wherein a portion of the coolant is directed through a bypass line in an air conditioning loop of the vehicle.

14. The method of claim 10, wherein the proportional control valve adjusts the flow rate into the chiller as a function of a predetermined chiller output.

15. The method of claim 10, further comprising operating the proportion control valve to adjust a flow rate of coolant into the chiller only if a vehicle air conditioning system is on.

16. A cooling arrangement for a vehicle comprising:
an air conditioning loop and a battery cooling loop connected together by a chiller for cooling vehicle cabin air and a battery;
a three-way proportional control valve connected to the chiller and the battery, the control valve configured to operatively control a chiller capacity for the battery; and
a duo valve connected to the proportional control valve and the battery, the duo valve configured to selectively direct battery coolant to bypass the chiller.

17. The cooling arrangement of claim 16, further comprising a by-pass line operatively connected to the control valve, wherein an outlet of the by-pass line is connected to a coolant pump.

18. The vehicle of claim 17, wherein the chiller includes an outlet on the battery cooling loop that is connected to the coolant pump.

19. The vehicle of claim 16, wherein the air conditioning loop further comprises a thermal expansion valve for controlling an amount of refrigerant from the air conditioning loop entering the chiller.

20. A vehicle comprising:
a cooling arrangement including an air conditioning loop and a battery cooling loop connected together by a chiller and arranged to cool each of cabin air and a battery; and a coolant three-way proportional control valve connected to the chiller and the battery, wherein the control valve is configured to operatively control a capacity of the chiller for the battery; wherein the air conditioning loop further comprises at least one evaporator and at least one thermal expansion valve for controlling introduction of refrigerant within the air conditioning loop into the chiller.

* * * * *